United States Patent
Vorobeichik et al.

(10) Patent No.: US 7,218,814 B2
(45) Date of Patent: May 15, 2007

(54) METHOD AND APPARATUS FOR OPTICAL MODE CONVERSION

(75) Inventors: Ilya Vorobeichik, Sunnyvale, CA (US); Maxim Greenberg, Haifa (IL); Yoav Berlatzky, Haifa (IL); Edvardas Narevicius, Sunnyvale, CA (US); Romanas Narevich, Mountain View, CA (US)

(73) Assignee: Optun (BVI) Ltd., Tortola (VG)

( * ) Notice: Subject to any disclaimer, the term of this patent is extended or adjusted under 35 U.S.C. 154(b) by 0 days.

(21) Appl. No.: 10/515,926

(22) PCT Filed: May 28, 2003

(86) PCT No.: PCT/IL03/00445
§ 371 (c)(1),
(2), (4) Date: Nov. 24, 2004

(87) PCT Pub. No.: WO03/100506
PCT Pub. Date: Dec. 4, 2003

(65) Prior Publication Data
US 2005/0157979 A1   Jul. 21, 2005

Related U.S. Application Data

(60) Provisional application No. 60/383,326, filed on May 28, 2002, provisional application No. 60/383,325, filed on May 28, 2002.

(51) Int. Cl.
*G02B 6/34* (2006.01)

(52) U.S. Cl. .......................................... 385/37; 385/15

(58) Field of Classification Search .................... None
See application file for complete search history.

(56) References Cited

U.S. PATENT DOCUMENTS

| | | | |
|---|---|---|---|
| 4,640,592 A | * | 2/1987 | Nishimura et al. ......... 385/125 |
| 5,048,909 A | * | 9/1991 | Henry et al. .................. 385/27 |
| 5,418,868 A | | 5/1995 | Cohen et al. |
| 5,488,681 A | * | 1/1996 | Deacon et al. ................ 385/37 |
| 5,574,808 A | | 11/1996 | van der Tol |
| 5,611,007 A | | 3/1997 | Wolf et al. |
| 5,623,566 A | | 4/1997 | Lee et al. |
| 5,703,977 A | | 12/1997 | Pedersen |
| 5,907,647 A | | 5/1999 | Eggleton et al. |

(Continued)

FOREIGN PATENT DOCUMENTS

EP       0473440       3/1992

(Continued)

OTHER PUBLICATIONS

U.S. Appl. No. 10/515,927, filed Nov. 24, 2004, Narevicius.

(Continued)

*Primary Examiner*—Frank G. Font
*Assistant Examiner*—Eric Wong
(74) *Attorney, Agent, or Firm*—Pearl Cohen Zedek Latzer, LLP

(57) ABSTRACT

A mode conversion apparatus including a dynamic waveguide section associated with a plurality of control elements that, when activated, are able to produce a periodic refractive-index perturbation pattern in the dynamic waveguide section, wherein the periodic refractive-index perturbation pattern is able to convert at least a fraction of an input signal from a first guided mode of the dynamic waveguide section into a second guided mode of the dynamic waveguide section.

25 Claims, 12 Drawing Sheets

U.S. PATENT DOCUMENTS

| | | | |
|---|---|---|---|
| 5,915,050 A | 6/1999 | Russell et al. | |
| 6,580,850 B1 * | 6/2003 | Kazarinov et al. | 385/28 |
| 6,584,248 B2 * | 6/2003 | Franzen et al. | 385/37 |
| 2002/0168129 A1 | 11/2002 | Gruber et al. | |
| 2002/0176131 A1 | 11/2002 | Walters et al. | |
| 2002/0191886 A1 | 12/2002 | Castoldi et al. | |
| 2003/0012509 A1 | 1/2003 | Chang et al. | |
| 2003/0039430 A1 | 2/2003 | Deliwala | |
| 2003/0156780 A1 * | 8/2003 | Margalit et al. | 385/15 |
| 2003/0174956 A1 * | 9/2003 | Viens | 385/43 |
| 2004/0028337 A1 * | 2/2004 | Vorobeichik et al. | 385/50 |

FOREIGN PATENT DOCUMENTS

| | | | |
|---|---|---|---|
| EP | 0513919 | | 11/1992 |
| EP | 0645650 | | 3/1995 |
| EP | 1193515 | * | 3/2002 |
| EP | 1193515 | | 4/2002 |
| JP | 62297827 | | 12/1987 |
| JP | 8254674 | * | 10/1996 |
| JP | 08254674 | | 10/1996 |

OTHER PUBLICATIONS

U.S. Appl. No. 10/515,768, filed Nov. 24, 2004, Narevicius et al.

Vance, et al, "Asymmetric Adiabatic Multiprong for Mode Multiplexed Systems", Electronics Letters, vol. 29, Nov. 25, 1993, pp. 2134-2136.

Shani, et al., "Integrated Optic Adiabatic Devices on Silicon", IEEE Journal of Quantam Ekectronics, vol. 27, No. 3, Mar. 1991, pp. 556-566.

Burns et al., "Active Branching Waveguide Modulator", Applied Physics Letters, vol. 29, No. 12, Dec. 15, 1976, pp. 790-792 (1976).

Sasaki et al., "Theoretical and Experimental Studies Active Y-Junctions in Optical Waveguides", IEEE Journal of Quantam Electronics, vol. QE-14, No. 11, Nov. 1978, pp. 883-892.

Haruna et al., "Thermo-Optic Deflection and Switching in Glass", Applied Optics, vol. 21, No. 19, Oct. 1, 1982, pp. 3461-3465.

Gokhberg, et al., Solution of the Vector Wave Equation by the Separable Effective Adiabatic Basis Set Method, J. Opt. Soc. Am., vol. 21, No. 10, Oct. 2004, pp. 1809-1817.

Burns et al., "Waveguide Transitions and Junctions", in "Guided-wave Optoelectronics", Edited by T. Tamir, Berlin, New York: Springer-Verlag (1990).

Narevich, et al., Optical Switching Based on the Adiabatic Temperature Induced Mode Localization, IEEE, 2003, pp. 128-129.

Lee, et al. "Variable Optical Attenuator Based on a Cutoff Modulator with Tapered Waveguides in Polymers", Journal of Lightwave Technology, IEEE, New York, US, vol. 17, No. 12, Dec. 1, 1999, pp. 2556-2561.

International Search Report for PCT/IL03/00445 dated Aug. 22, 2003.

* cited by examiner

METHOD AND APPARATUS FOR OPTICAL MODE CONVERSION

CROSS-REFERENCE TO RELATED APPLICATIONS

This application is a National Phase Application of PCT International Application No. PCT/IL03/00445, International Filing Date May 28, 2003, claiming priority of U.S. Provisional Patent Applications, 60/383,326, filed May 28, 2002, and Ser. No. 60/383,325, filed May 28, 2002.

FIELD OF THE INVENTION

The present invention relates generally to the field of optical devices and, more specifically, to optically converting a mode order of a light signal.

BACKGROUND OF THE INVENTION

In the field of integrated optics, there may be a need to use a mode conversion device, such as a mode converter (MC).

European Patent Application EP-0513919-A1 to Van Der Tol describes a passive device for mode conversion of a first mode into a second pre-defined mode. The device is described to include a periodic geometrical structure consisting of a periodic sequence of two wave-guiding subsections within each period, wherein the lengths of the subsections and the number of periods being matched to a pre-determined conversion fraction may be designed to allow coupling of a first pre-defined guided mode to a second pre-defined guided mode. Similar devices are also described in U.S. Pat. No. 5,703,977 to Pedersen et al and in European Patent Application EP0645650A1 to Van Der Tol. In such passive devices, the fraction of light being converted is pre-determined by the geometry of the device and, therefore, the activation and operation of such devices cannot be selectively adjusted or controlled.

U.S. Pat. No. 5,574,808 to Van Der Tol et al describes a mechanism for activating and de-activating a mode-conversion device. The described device is activated by activating an electrode designed to disrupt the coupling between guided modes of the device, thereby to convert the coupling of a signal from a first guided mode to a second guided mode.

SUMMARY OF EMBODIMENTS OF THE INVENTION

Exemplary embodiments of the present invention provide a Mode Converter (MC), which may operate in conjunction with one or more single-mode and/or multi-mode waveguides. The MC according to embodiments of the invention may have at least two states of operation, namely, "On" and "Off". When the MC is at the "Off" state, a mode of order i enters the MC and the same mode of order i may exit the MC. In contrast, when the MC is set to the "On" state, the mode of order i entering the MC may be at least partially converted to a mode of order j exiting the MC. According to some of these exemplary embodiments, only a certain portion of the mode of order i may be converted into the mode of order j, such that two mode-orders, for example, i and j, may exit the MC. The relative portion of converted light may be controllably varied, if desired. In other exemplary embodiments, the signal carried by mode order i is converted substantially entirely to mode order j.

Exemplary embodiments of the invention enable dynamic and/or selective and/or tunable mode conversion of a fraction of a signal component propagating according to a first guided mode, or substantially the entire signal component, into a signal component propagating at least partially according to a desired second guided mode.

In accordance with exemplary embodiments of the invention, a MC may include an input section, a dynamic waveguide section, and an output section. The dynamic waveguide section may be surrounded by a top cladding, a bottom cladding, a base substrate and a set of control elements, e.g., heating elements, which may be attached to an outer surface of the top or bottom cladding surrounding the dynamic waveguide section.

In exemplary embodiments of the invention, a thermo-optical effect may be utilized to achieve selective and/or dynamic and/or tunable refractive-index perturbation. The heating elements may be implemented in the form of electrodes, for example, strips of material having a suitable electrical resistance supplied with electrical current to produce a predetermined increase in temperature, thereby tunably controlling the temperature distribution along the dynamic section of the device.

According to exemplary embodiments of the invention, the magnitude of electrical power supplied to the heating elements may be controllably and/or selectively varied to allow controllable tuning of the conversion between the first guided mode and the desired second guided mode. Supplying the heating elements with greater electrical power per unit length may increase the temperature more sharply and, thus, may result in a higher coupling coefficient between the first and second guided modes. The coupling coefficient may influence the fraction of light converted between the modes. Thus, the power supplied to the heating elements may be dynamically tunable to provide at least a partial conversion between the first guided mode and the desired second guided mode.

According to embodiments of the invention, the MC may be combined with additional elements, e.g., with appropriate input and output waveguides, to form a Variable Optical Attenuator (VOA), which may provide controllable attenuation of an optical signal.

In further exemplary embodiments of the invention, the MC may be adapted for use as a wavelength filter, which may be tunable to convert signals only within a predetermined wavelength range.

According to some exemplary variations of this embodiment, a set of one or more mode converters may be adapted to provide a Dynamic Gain Equalizer (DGE), which may be used in optical networks, for example, to "flatten" the spectra of optical signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1A:
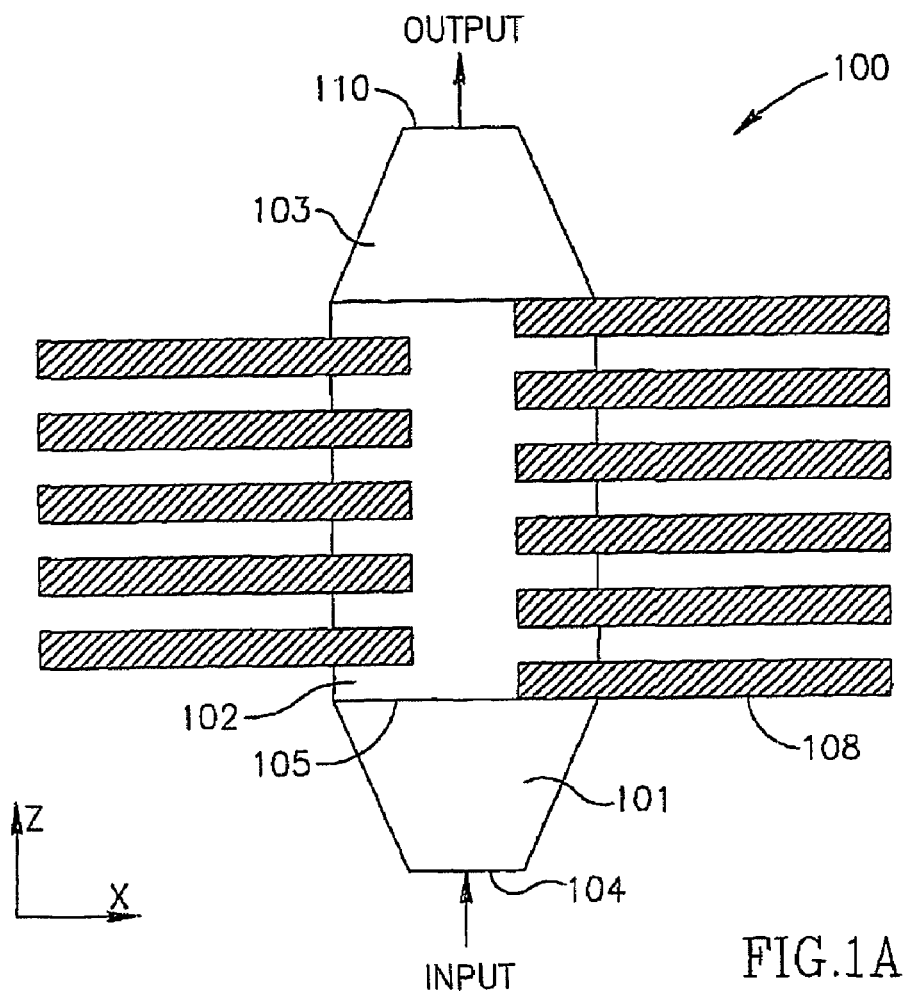
FIG. 1A is a schematic, simplified plane view illustration of a mode converter in accordance with exemplary embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity or several physical components included in one element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

According to embodiments of the invention, a Mode Converter (MC) may operate in conjunction with one or more single mode and/or multi-mode waveguides, and may have at least two states of operation, e.g., "On" and "Off". When the MC is at the "Off" state, the mode of order i enters the MC and the same mode of order i exits the MC. When the MC is at the "On" state, the mode of order i entering the MC may be at least partially converted into a mode of order j that exits the MC. According to some of these embodiments, the mode of order i may be partially converted into the mode of order j, such that two mode-orders, e.g. i and j, exit the MC. The fraction converted between the two modes may be controlled as described below. In other exemplary embodiments, the signal carried by mode order i is converted substantially entirely to mode order j.

Exemplary embodiments of the present invention enable dynamic, tunable, mode conversion of a fraction of a signal component propagating according to a first guided mode, or substantially the entire signal component, into a signal component propagating according to a desired second guided mode.

Figure 1B:
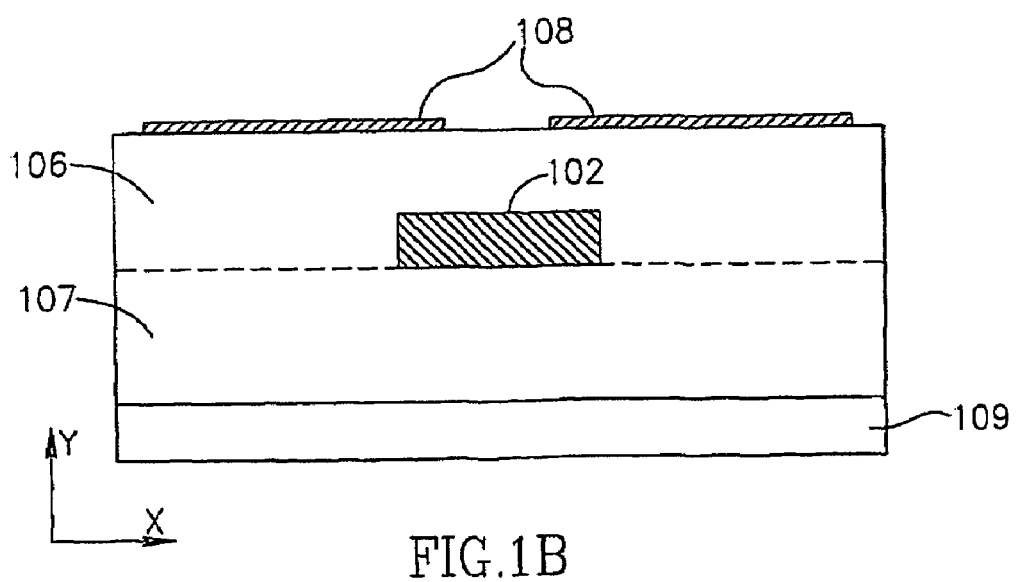
FIG. 1B is a schematic, simplified, front view, cross-sectional, illustration of the mode converter of FIG. 1A.

Reference is made to FIGS. 1A and 1B, which schematically illustrate a MC 100 in accordance with exemplary embodiments of the present invention MC 100 may include an input section 101, a dynamic waveguide section 102 and an output section 103. Input section 101 may be implemented in the form of an adiabatic waveguide expander, and output section 103 may be implemented in the form of an adiabatic waveguide constrictor, as explained in detail below.

According to exemplary embodiments of the invention, input section 101 may support up to N guided modes. An input end 104 of input section 101 may have a width sufficient to support a required amount of N guided modes, yet sufficiently narrow to avoid unnecessary mixing between the N guided modes. In embodiments of the invention, the effective refractive index, which relates to a propagation constant of the signal, of a signal carried by a mode of a waveguide having a waveguide-core and a waveguide-cladding, may be smaller than the refractive index of the waveguide-core and larger than the refractive index of the waveguide-cladding. For given refractive indices of the waveguide-core and to waveguide-cladding, a waveguide supporting a larger number of mode-orders, e.g., a relatively wider waveguide, may result in a smaller difference between the propagation constants corresponding to each of the supported mode orders, respectively. The smaller the difference between the propagation constants corresponding to different mode orders, the higher the coupling, which may result in unnecessary mixing, between the different mode orders, for example, due to variations in the waveguide structure.

According to exemplary embodiments of the invention, input section 101 may be shaped as an adiabatic waveguide expander, for example, having a tapered structure, whereby the width of the waveguide gradually increases to substantially the width of dynamic section 102 at an interface 106 between input section 101 and dynamic section 102. Output section 103 may be shaped as an adiabatic waveguide restrictor, for example, having a tapered structure substantially analogous to the input section structure, yet in a reversed direction, whereby the waveguide is gradually decreased from the width of dynamic section 102 to a relatively narrow width at output end 110, for example, to the width of input end 104.

The length of the input and output sections may be adapted to allow a desired adiabatic expansion and constriction, respectively, of the waveguide. Adiabatic expansion/constriction in this context means that an i-th mode of input waveguide 101 at its input end 104 may become the i-th mode at interface 105, and vice-versa, substantially without affecting any other modes. The degree of adiabaticity of the expansion/constriction may increase with the length of the tapered sections. The adiabatic expansion/constriction of input section 101 and output section 103 may be achieved in the form of various tapered structures known in the art, including but not limited to linear, polynomial, exponential, or hyperbolic tapered structures.

In an exemplary embodiment of the invention, dynamic section 102 may be surrounded by a top cladding 106, a bottom cladding 107, a base substrate 109, and a plurality of control elements, e.g., heating elements 108, which elements may be attached, e.g., located on, the outer surface of top cladding 106. The top and bottom cladding may be formed of any material suitable to line or cover dynamic section 102, for example, a plastic or glass sheath that may surround dynamic section 102 and may be fused to the waveguide. The cladding may reflect light guided by dynamic section 102 thereby to prevent unnecessary loss of light and strengthen the guided light intensity. According to embodiments of the invention, the refractive index of the material of dynamic section 102 at normal temperature may be generally higher than the refractive index of claddings 106 and 107. Base substrate 109 may be formed of any material known in the art, for example, silicon.

Base substrate 109 may act as a heat sink, and may be held at a substantially constant temperature by use of a Thermo-Electric Cooler (TEC) or any other device adapted to keep the substrate at a substantially constant temperature.

Embodiments of the present invention allow for dynamic, tunable, effective refractive-index perturbation. Such perturbation may be implemented by several methods including but not limited to charge carrier injection, acousto-optic effect, electro optical effect, optical-optic effect, or thermo-optic effect.

Refractive-index perturbation, in accordance with embodiments of the invention, may be achieved by creating a periodical refractive-index pattern including a periodic concatenation of two subsections with different refractive indices. According to exemplary embodiments of the invention, refractive-index perturbation as described herein, or any other suitable perturbation scheme, may be applied by elements 108 to a region of dynamic section 102, while other regions of dynamic section 102 may remain unaffected.

Figure 1C:
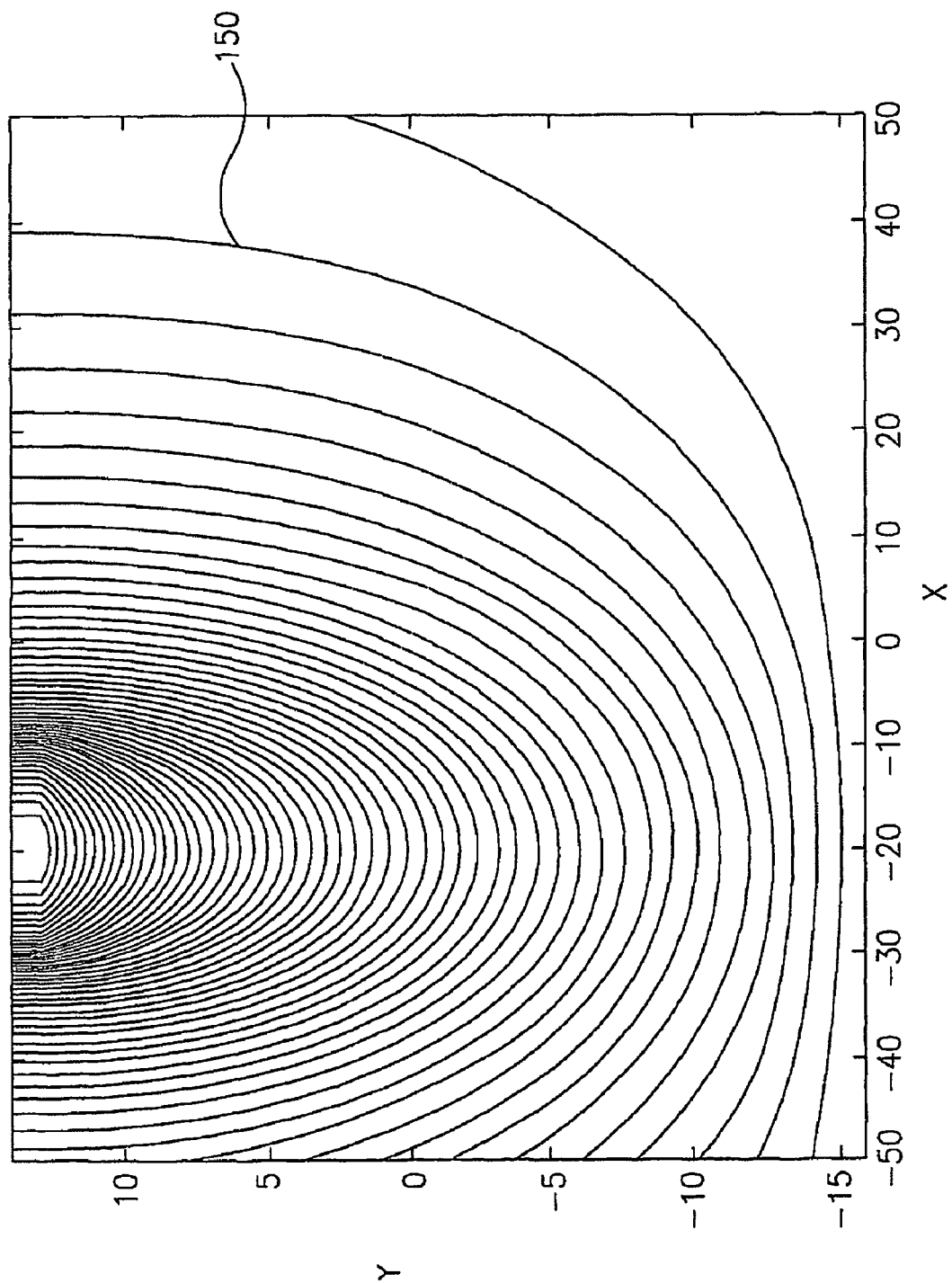
FIG. 1C is a schematic illustration of graph depicting temperature increase as a function of location in a cross-section of a waveguide, in a vicinity of a heating element, according to exemplary embodiments of the invention.

In exemplary embodiments of the present invention, a thermo optical effect may be utilized to achieve dynamic refractive index perturbation. Heating elements 108, which may act as thermo-optical refractive index modifiers, may be implemented in the form of electrodes, for example, strips of material having predetermined electrical resistance. By controllably and/or selectively supplying electrical current to the electrodes, an increase in temperature in the vicinities of each of the electrodes results in a predetermined temperature distribution across dynamic section 102. An example of such temperature distribution is illustrated schematically by isothermal lines 150 in FIG. 1C.

The thermo-optical effect evoked by the controllable and/or selective temperature increase may create a refractive index perturbation in regions of dynamic section 102 covered by heating elements 108, while regions not covered by heating elements 108 may not undergo any refractive index perturbation. Thus, a periodic refractive index perturbation may be achieved by implementing a periodic arrangement of heating elements 108.

Figure 2A:
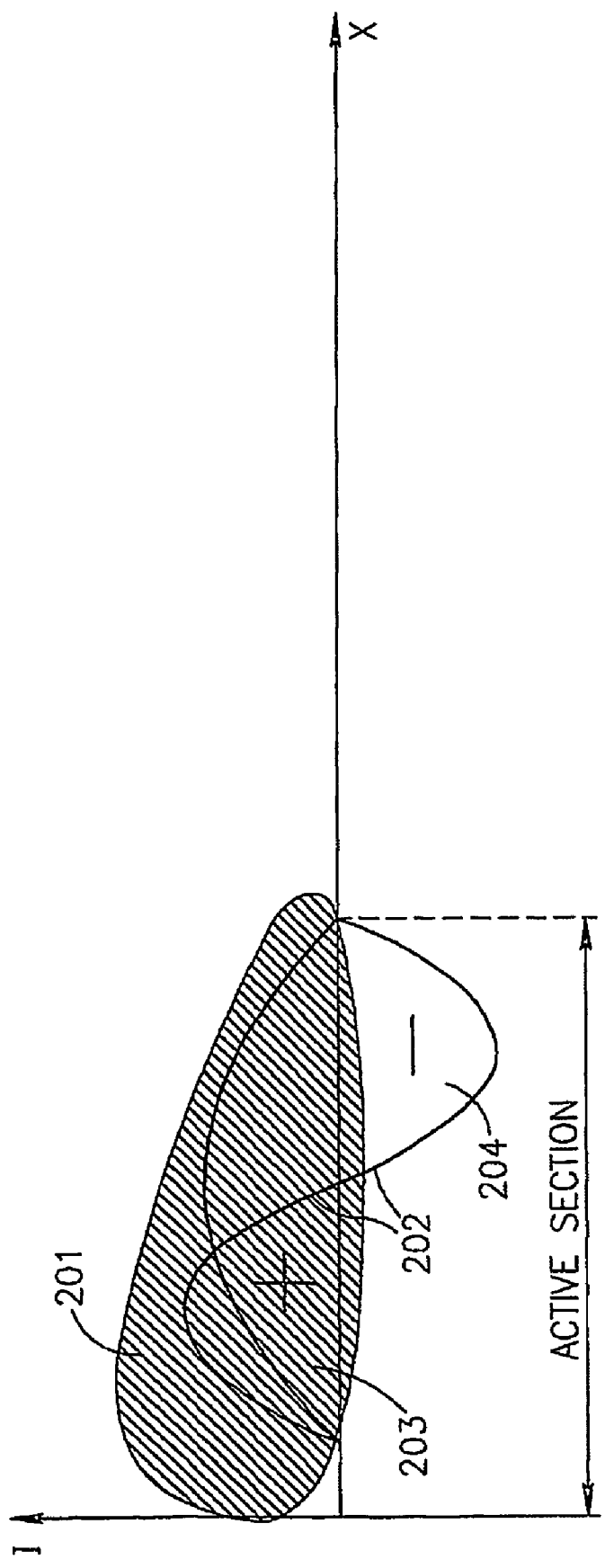
FIG. 2A is a schematic graph depicting light intensity and area undergoing refractive-index perturbation, respectively, as a function of position within a mode converter having a relatively narrow dynamic section in accordance with an exemplary embodiment of the invention.
Figure 2B:
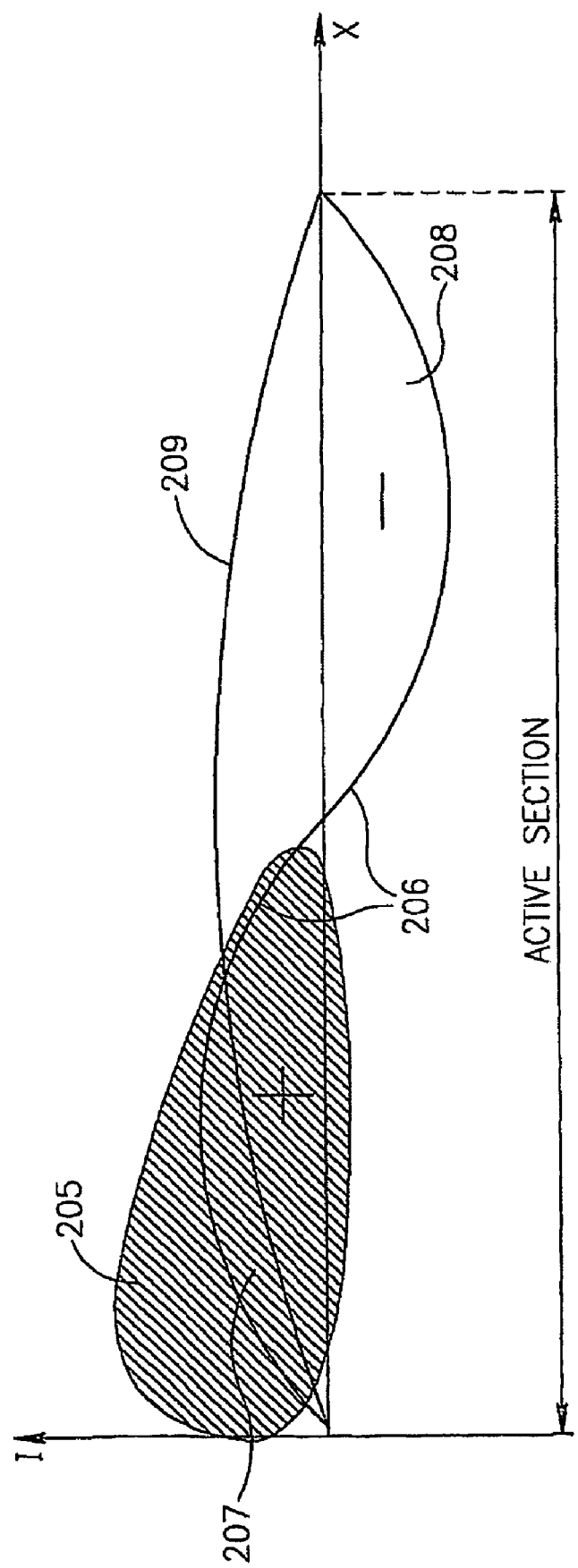
FIG. 2B is a schematic graph depicting light intensity and area undergoing refractive-index perturbation, respectively, as a function of position within a mode converter having a relatively wide dynamic section in accordance with an exemplary embodiment of the invention.

FIG. 2A schematically depicts graphs of light intensity and area undergoing refractive-index perturbation, respectively, as a function of position within a mode converter having a relatively narrow dynamic section in accordance with an exemplary embodiment of the invention, and FIG. 2B schematically depicts graphs of light intensity and area undergoing refractive-index perturbation, respectively, as a function of position within a mode converter having a relatively wide dynamic section in accordance with an exemplary embodiment of the invention.

According to perturbation theory, a coupling coefficient between two modes may be estimated by the following equation:

$$\text{Coupling coefficient} = \int \Psi_1 \Delta \Psi_2 dx dy \quad (1)$$

wherein $\psi_1$ and $\psi_2$ are transverse profiles of a zero-order mode and a first-order mode, respectively, and $\Delta$ is a refractive index perturbation term.

Since the zero-order mode, $\psi_1$, and refractive index perturbation term, $\Delta$, are constantly positive, the sign of the coupling coefficient depends on the sign of the first-order mode, $\psi_2$. To analyze the significance of Equation 1, two cases may be examined, as illustrated schematically in FIGS. 2A and 2B, respectively. If a refractive-index perturbation field 201 affects a relatively large portion of dynamic section 102, as illustrated in FIG. 2A, the field may influence both a positive part 203 and a negative part 204 of a first order mode 202, thereby allowing the coupling obtained in positive part 203 to be partially canceled by the negative contribution of negative part 204. In contrast, if an index perturbation field 205 affects only a relatively small part of dynamic section 102 and affects only a positive part 207 of a first-order mode 206, as illustrated in FIG. 2B, no cancellation between positive part 207 and a negative part 208 may take place, whereby sufficient coupling may be obtained to allow conversion from a zero-order mode 209 to first-order mode 206.

According to embodiments of the invention, the width of dynamic section 102 may be designed to provide a degree of coupling sufficient for conversion of a signal from the first guided mode to the desired second guided mode. A required width of the dynamic section may be determined according to the desired order of the second mode and according to the slope of the index perturbation profile created by the heating elements, e.g., the steeper the slope of the perturbation profile and the lower the order of the desired second mode, the narrower the dynamic section required to provide the degree of coupling sufficient to allow the conversion from the first guided mode to the desired second guided mode.

According to embodiments of the invention, the refractive-index perturbation may be performed periodically along the dynamic section. A grating period, $\Lambda_0$, i.e., the period of the refractive-index perturbation, may be proportional to the width of the dynamic section, e.g., the wider the dynamic section the larger the grating period, as explained below.

According to embodiments of the invention, in order to increase the coupling coefficient between the first guided mode and the desired second guided mode, the grating period may be reciprocal to a phase difference between the first guided mode and the second guided mode, as described above. The phase of each of the mode-orders is proportional to the effective refractive index of the mode-order, respectively. Since the difference between the refractive indices is reciprocally proportional to the width of the waveguide, as described above, the grating period may be proportional to the width of the waveguide, i.e., a wider waveguide will correspond to a larger grating period.

Therefore, the grating period, $\Lambda_0$, may be calculated using the following equation:

$$\Lambda_0 = \frac{\lambda_0}{n_1(\lambda_0) - n_2(\lambda_0)} \qquad (2)$$

wherein $\lambda_0$ is the wavelength of the signal, and $n_1(\lambda_0)$ and $n_2(\lambda_0)$ are the refractive indices corresponding to the first guided mode and the second guided mode, respectively.

According to embodiments of the invention, the conversion of the first guided mode into the second guided mode may be preformed gradually, such that each period of the perturbation converts a portion of the first guided mode into the second guided mode. Therefore, a number of successive grating periods may be used to convert a desired aggregated fraction of at least part of the first guided mode into the second guided mode.

According to embodiments of the invention, the heating elements may be dynamically activated, e.g., by controlling the electric power supplied to the control elements, to control the portion of the first guided mode which is converted into the second guided mode at each grating period, as described above.

According to embodiments of the invention, the refractive index perturbation profile may change the mode-coupling coefficient between the first guided mode and other mode orders. By controlling the refractive index perturbation profile, e.g., by tunable activation of the control elements, the conversion of a desired fraction of the light signal from the first guided mode to the desired second guided mode may be controlled.

According to embodiments of the invention, the magnitude of electrical power supplied to heating elements 108 (FIG. 1) may be varied to allow a tunable degree of coupling between the two modes. Heating elements 108 (FIG. 1) may be supplied with a predetermined electric power per unit length of the heating elements so as to create a refractive-index perturbation profile corresponding to the coupling coefficient required for conversion between the two modes.

According to some embodiments of the invention, the heating elements may be selectively activated, e.g., by selectively, controllably supplying electric power to some of the control elements, so as to create a grating period corresponding to a desired aggregated conversion fraction, as described above.

Figure 3A:
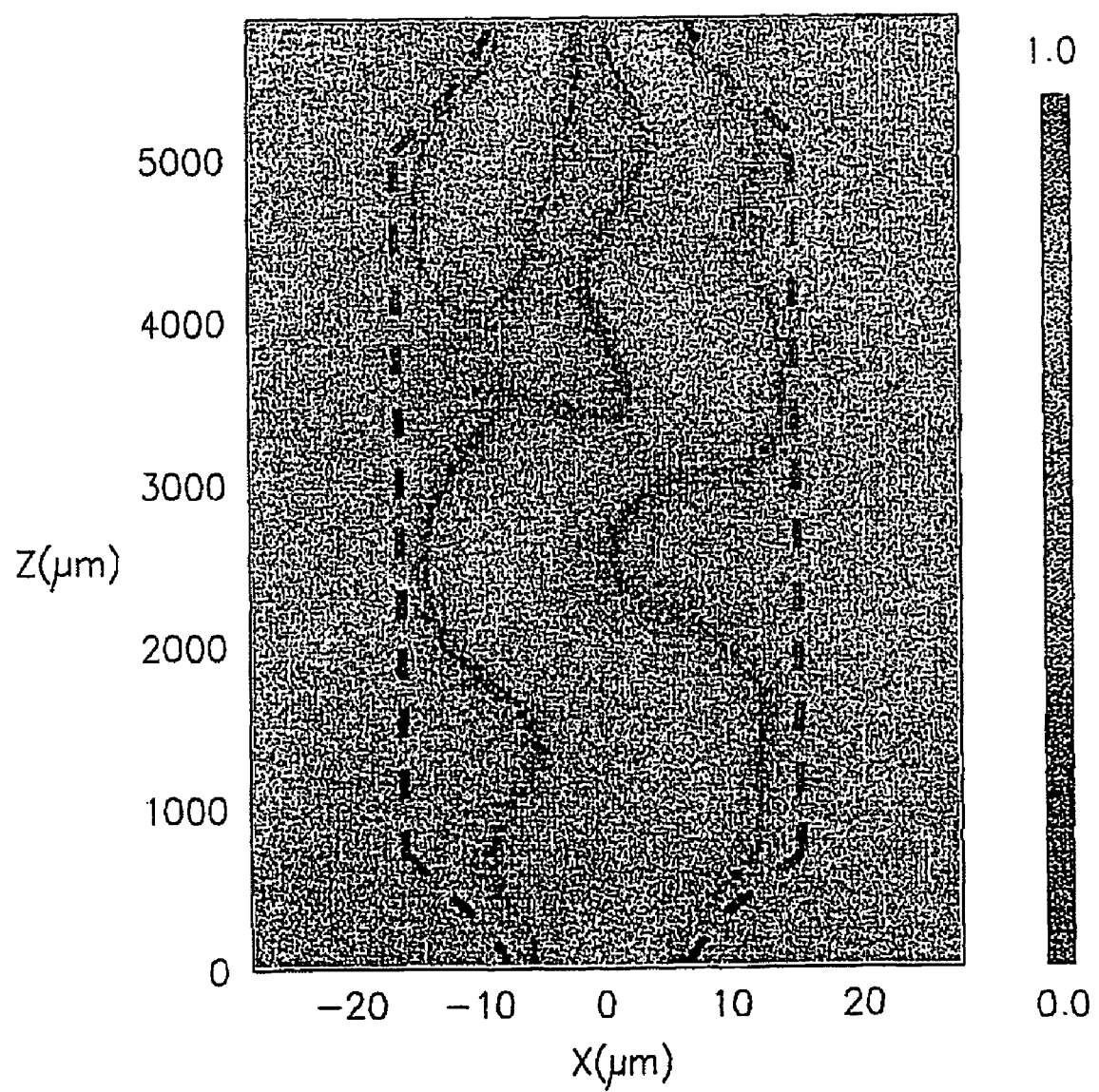
FIG. 3A is a schematic, top view, cross-sectional illustration of a mode converter according to an exemplary embodiment of the invention, depicting conversion between a zero-order mode and a first-order mode.
Figure 3B:
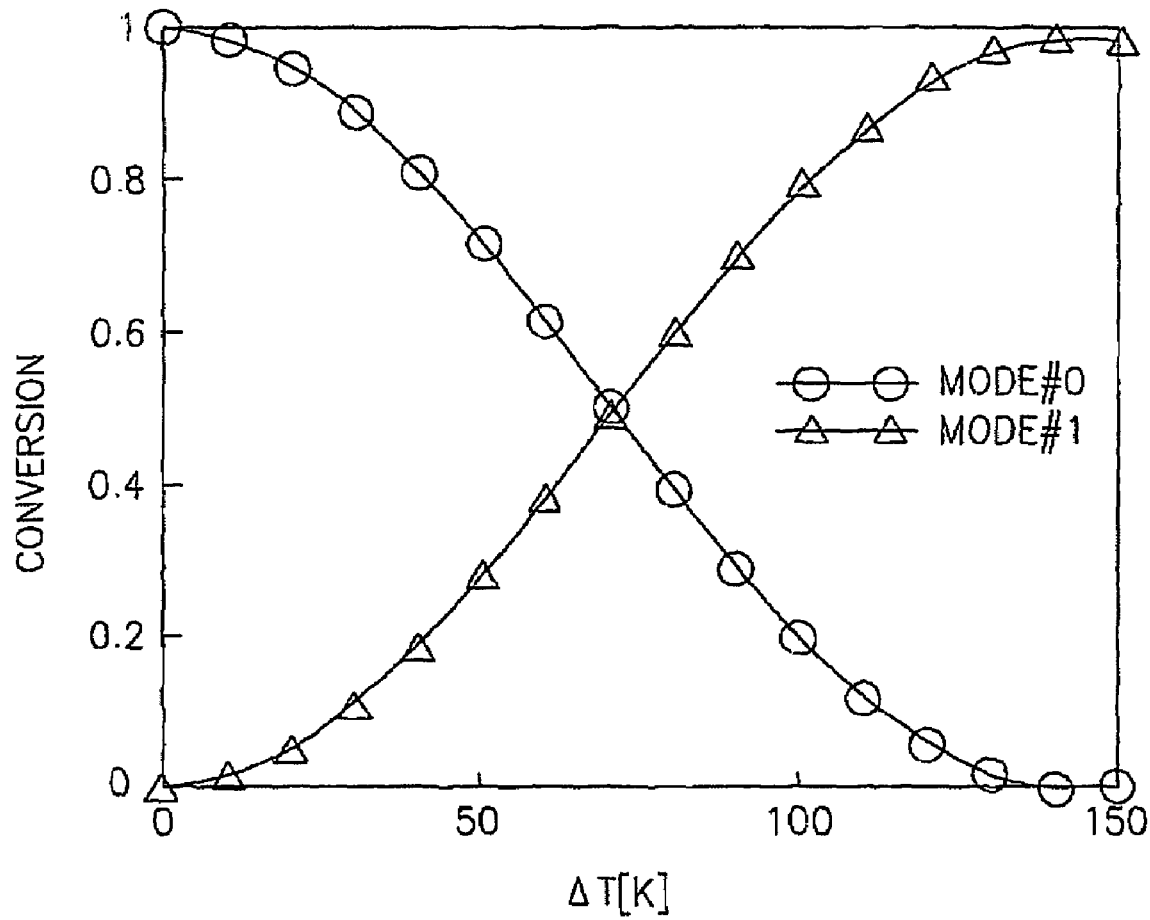
FIG. 3B is a schematic illustration of a graph depicting a fraction of light converted from the zero-order mode to the first-order mode by the mode converter of FIG. 3A as a function of a temperature increase selectively applied to portions of the mode converter.

FIG. 3A is a schematic, top-view, cross-sectional illustration of a mode converter according to an exemplary embodiment of the invention, showing conversion between a zero-order mode and a first-order mode, and FIG. 3B is a schematic illustration of a graph depicting a fraction of light converted from the zero-order mode to the first-order mode as a function of a temperature increase selectively applied to portions of the mode converter of FIG. 3A.

Referring again to FIG. 1, according to some exemplary embodiments of the invention, MC 100 may have a total length, $L_{total}$, of between 500 µm and 50000 µm, for example, about 6000 µm; input end 104 may have a width of between 4 µm and 60 µm, for example, about 12 µm, and a height of 0.5 µm to 8 µm, for example, about 6 µm; dynamic section 102 may have a width of between 6 µm and 100 µm, for example, about 24 µm, and a height of between 0.5 µm and 8 µm, for example, about 6 µm; and output end 110 may have a width of between 4 µm and 60 µm, for example, about 12 µm, and a height of between 0.5 µm and 8 µm, for example, about 6 µm. Further, in exemplary embodiments of the invention, top cladding 106 may have a height of between 6 µm and 30 µm, for example, about 10 µm, and bottom cladding 107 may have a height of between 6 µm and 30 µm, for example, about 15 µm. Additionally, in exemplary embodiments of the invention, there may be a refractive index difference, $\Delta n$, between the dynamic section and the cladding of between 0.005 and 3.0, for example, about 0.01.

In exemplary embodiments of the invention, the MC may also include heating elements 108 (FIG. 1) spaced in a repetitive grating period, $\Lambda_0$, of between 50 µm and 10000 µm, for example, about 2715 µm. In this exemplary embodiment of the invention, adiabatic expansion and constriction of the waveguide may be achieved by hyperbolic tapering, wherein the tapered length of the input section and the output section, respectively, $L_{tapering}$ may be between 50 µm and 5000 µm, for example, about 800 µm. A power level, P, for example, 0.05 Watts (W) to 5.0 W, e.g., about 2.1 W, may be supplied to the heating elements to create a corresponding maximal temperature increase of between 10 and 500 degrees Kelvin (°K), for example, about 150° K, in the vicinity of each of the electrodes, as described above. This temperature increase may allow conversion of a predetermined fraction of the signal from the zero-order mode to the first-order mode, as illustrated in FIG. 3A. For example, in order to achieve a conversion of about 99% between the zero-order mode and the first-order mode, a temperature increase of 150° K may be required, as illustrated in FIG. 3B. The temperature increase may be tuned by controlling the power supplied to the electrodes, as described above. Thus, any desired fraction of the zero-order mode may be converted into the first-order mode, by creating an appropriate temperature increase corresponding to the desired fraction of conversion, as illustrated in FIG. 3B.

According to other embodiments of the invention, different configurations, e.g. height and width of the different MC sections, $\Lambda_0$, $L_{tapering}$, P, or any other parameter defining the MC, may be designed in order to allow at least partial, tunable mode conversion between any two desired mode-orders.

According to exemplary embodiments of the invention, MC 100 (FIG. 1) may provide selective, dynamic control, i.e., tunability, of the fraction of light converted between two modes, thereby providing dynamic switching between "On" and "Off" states of the MC in relation to desired modes. When at the "Off" state, the MC may not require electric power and may represent a simple tapered waveguide, providing sufficiently low cross-talk, e.g. minimal unnecessary mixing between modes, as described above. When at the "On" state, a desired fraction of light carried by a chosen guided mode, e.g., a zero-order mode, may be selectively converted to another guided mode, e.g., a first-order mode, by controlling the power supplied to heating elements 108 (FIG. 1).

Figure 4B:
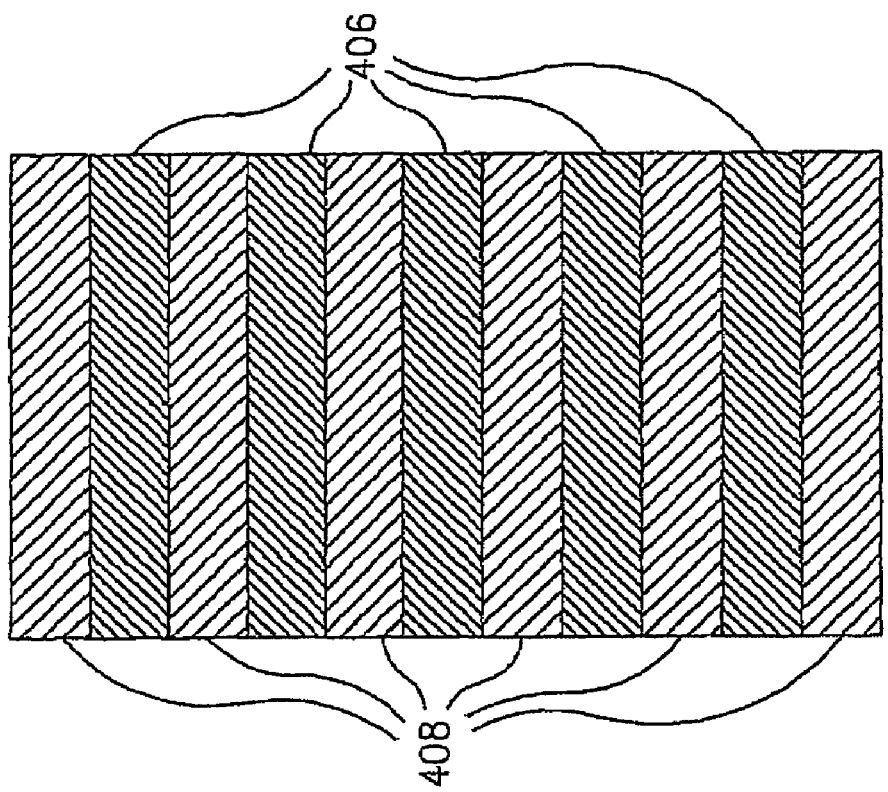
FIGS. 4A and 4B are schematic illustrations of two exemplary configurations, respectively, of heating elements of a mode converter in accordance with embodiments of the present invention.
Figure 4A:
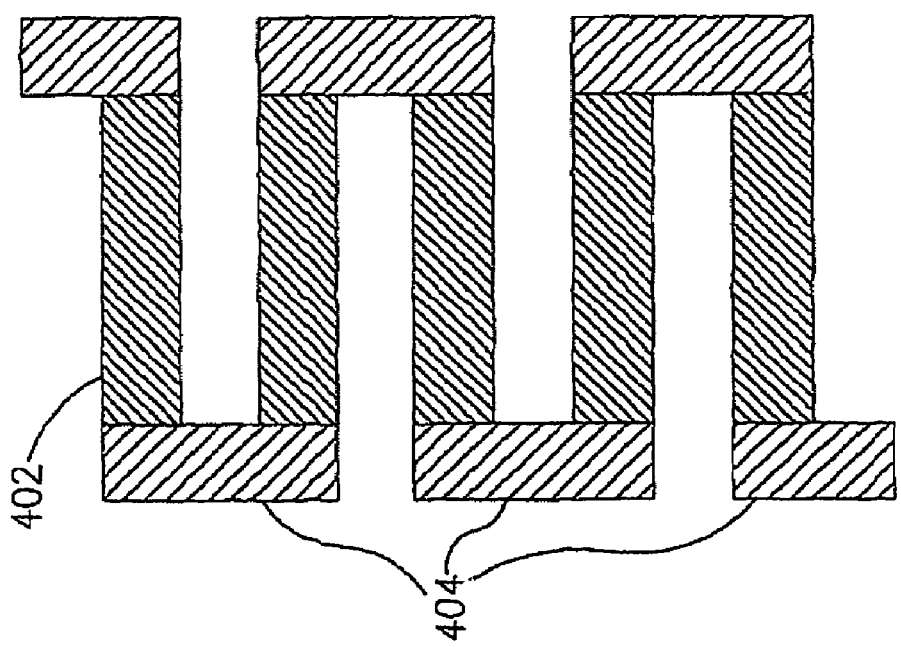

Reference is now made to FIGS. 4A and 4B, which illustrate two exemplary configurations of heating elements 108 (FIG. 1) of a MC in accordance with embodiments of the invention.

According to embodiments of the invention, heating elements 108 (FIG. 1) may be configured in different ways to provide a desired periodical refractive-index pattern, for example, the configuration illustrated in FIGS. 4A and 4B. The configuration shown in FIG. 4A may be produced by etching a desired pattern out of a resisting material layer, leaving a plurality of strips 402 that may be used as heating elements 108 (FIG. 1). Strips 402 may be sequentially connected to each other by strips 404 of a suitable conducting material, for example, using Aluminum strips.

To produce the configuration of FIG. 4B, a layer of electrically-resistant material 406 may initially be covered with a layer of conducting material 408, which may subsequently be etched in accordance with the desired pattern. In the resultant pattern, portions of layer 406 not covered with conducting layer 408 act as heating elements 108 (FIG. 1), whereas portions covered with non-etched conducting material 408 do not produce heat in response to an applied voltage.

According to embodiments of the invention, MC 100 may be combined with additional elements in order to create a Variable Optical Attenuator (VOA), which may provide controllable, e.g., tunable, attenuation of an optical signal, as discussed below.

Figure 5:
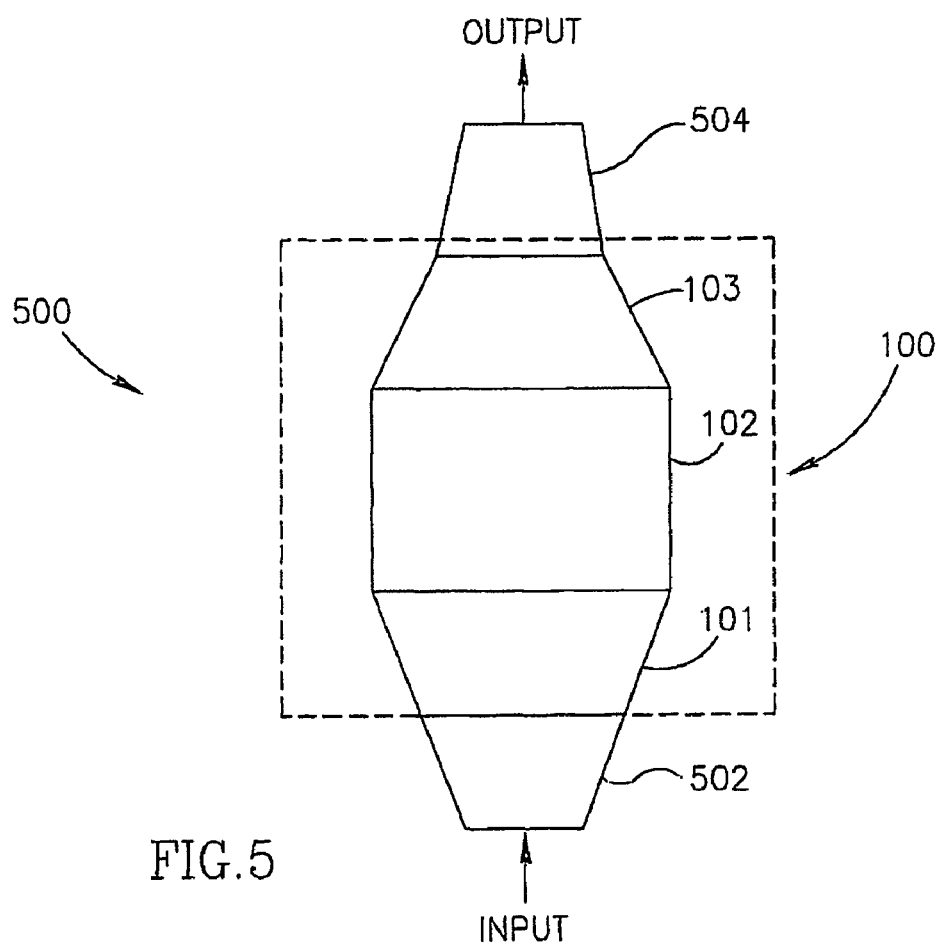
FIG. 5 is a schematic, simplified, plane view illustration of a Variable Optical Attenuator (VOA) including a mode converter in accordance with exemplary embodiments of the present invention.

Reference is now made to FIG. 5, which is a schematic, simplified, plane view illustration of a VOA 500 including MC 100 in accordance with exemplary embodiments of the present invention.

In order to implement VOA 500, according to exemplary embodiments of the invention, a VOA input section 502 and a VOA output section 504 may be added to the input and output ends, respectively, of a MC such as MC 100. In some embodiments of the invention, VOA input section 502 may be adapted to provide adiabatic expansion from a width of an input waveguide (not shown), for example a narrow waveguide designed to support only one mode, e.g., a zero-order mode, of an input signal, to the width of MC input section 102, which may support higher-order modes. VOA output section 504 may be designed to provide adiabatic constriction from the width of MC output section 103, which is may support higher-order modes, to the width of an output waveguide (not shown), which may support only one mode, for example, the same order mode supported by the input waveguide.

According to embodiments of the invention, attenuation of the input light signal may be achieved by using MC 100 to convert a desired fraction of the input light signal from the input mode into a higher-order mode. Thus, a partially converted light signal, exiting the MC, may include the converted fraction of the higher-order mode and a non-converted fraction of the input-order mode. However, because the output waveguide may be designed to support only the input-order mode, all the power carried by the higher-order mode may be diffracted, dispersed, or otherwise dissipated by a cladding of the output waveguide. Therefore, the final output of VOA 500 is an attenuated signal retaining the mode order of the input signal.

According to embodiments of the invention, the MC may be tunably controlled, as described above, to provide mode conversion of the desired fraction of the light signal. The larger the converted fraction, the smaller the non-converted fraction and, therefore, more conversion results in less power of the light signal exiting the VOA. In other words, a larger conversion fraction results in a higher attenuation level of the VOA. Thus, the maximal attenuation level achievable by VOA 500 may depend on the efficiency at which the MC of the VOA may convert the input-order mode into the higher-order mode. According to some of these embodiments, a number of VOA devices 500 may be cascaded to obtain a desired aggregated attenuation level. Implementation of such cascading will be apparent to those of ordinary skill in the art.

According to embodiments of the invention, in order to provide a desired mode conversion, heating elements 108 (FIG. 1) may be used to provide a periodic refractive index perturbation pattern, as described above. According to exemplary embodiments of the invention, this feature may be utilized by an adaptation of the MC described above for use as a wavelength filter, as explained below.

A wavelength response of the MC may be defined as a correlation between the conversion ability of the MC and the wavelength of an input signal.

In exemplary embodiments of the invention, the MC may be adapted to operate as a wavelength filter, for example, by using various techniques that improve the wavelength response of the MC, for example, apodization or chirping, as described below.

Figure 6:
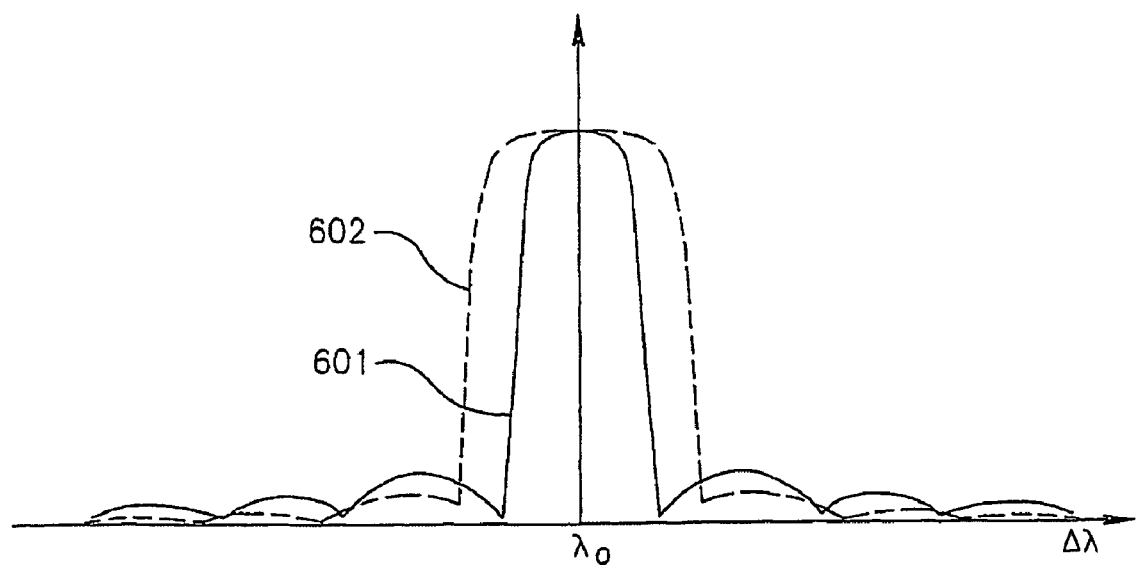
FIG. 6 is a schematic illustration of a graph depicting a wavelength response curve of a mode converter, and a wavelength response curve of a wavelength filter including an adapted mode converter, in accordance with exemplary embodiments of the present invention.

FIG. 6 schematically illustrates a graph depicting a wavelength response curve 601 of a mode converter as described above, compared with a wavelength response curve 602 of a MC adapted to operate as a wavelength filter, in accordance with exemplary embodiments of the present invention.

The areas confined under curves 602 and 601 may define the wavelength-ranges of signals that may be converted by each of the mode converters.

As described above with reference to Equation 2, the grating period, $\Lambda_0$, of the MC may relate to the wavelength of the input signal, $\lambda_0$. Thus, by controllably tuning the grating period of MC 100 (FIG. 1), as described above, a tunable wavelength response may be obtained.

A Full-Width-Half-Maximum (FWHM) of a wavelength response curve of a MC may depend on the coupling strength of the MC. The stronger the coupling, the larger the FWHM of the wavelength response curve. Accordingly, a weaker coupling may result in a relatively smaller FWHM. Thus, a relatively small FWHM may provide a relatively sensitive wavelength filter, allowing conversion of signals having a pre-determined range of wavelengths. However, a weaker coupling may require a larger number of grating periods to achieve full mode-conversion, as described above. A larger number of grating periods may require a longer MC, which may have a wavelength response as illustrated by curve 601.

As shown in FIG. 6, curve 601 may have a relatively narrow peak and relatively high lobes. Thus, the MC may allow conversion of a relatively wide range of signals having a relatively wide range of wavelengths, respectively.

As further shown in FIG. 6, wavelength response curve 602 may have a wider and flattened peak and suppressed side-lobes in comparison to response curve 601. The suppressed lobs of curve 602 imply MC 100 (FIG. 1), when further adapted to operate as a wavelength filter, for example, using apodization and/or chirping techniques as described below, may convert a relatively narrow range of signals having a relatively narrow range of wavelength, respectively. Thus, a wavelength filter using a mode converter in accordance with embodiments of the invention may allow a more accurate, tunable, conversion of signals within a pre-determined range of wavelengths, centered at a wavelength $\lambda_0$, and may not allow conversion of signals outside the predetermined wavelength range, as described below.

Figure 7A:
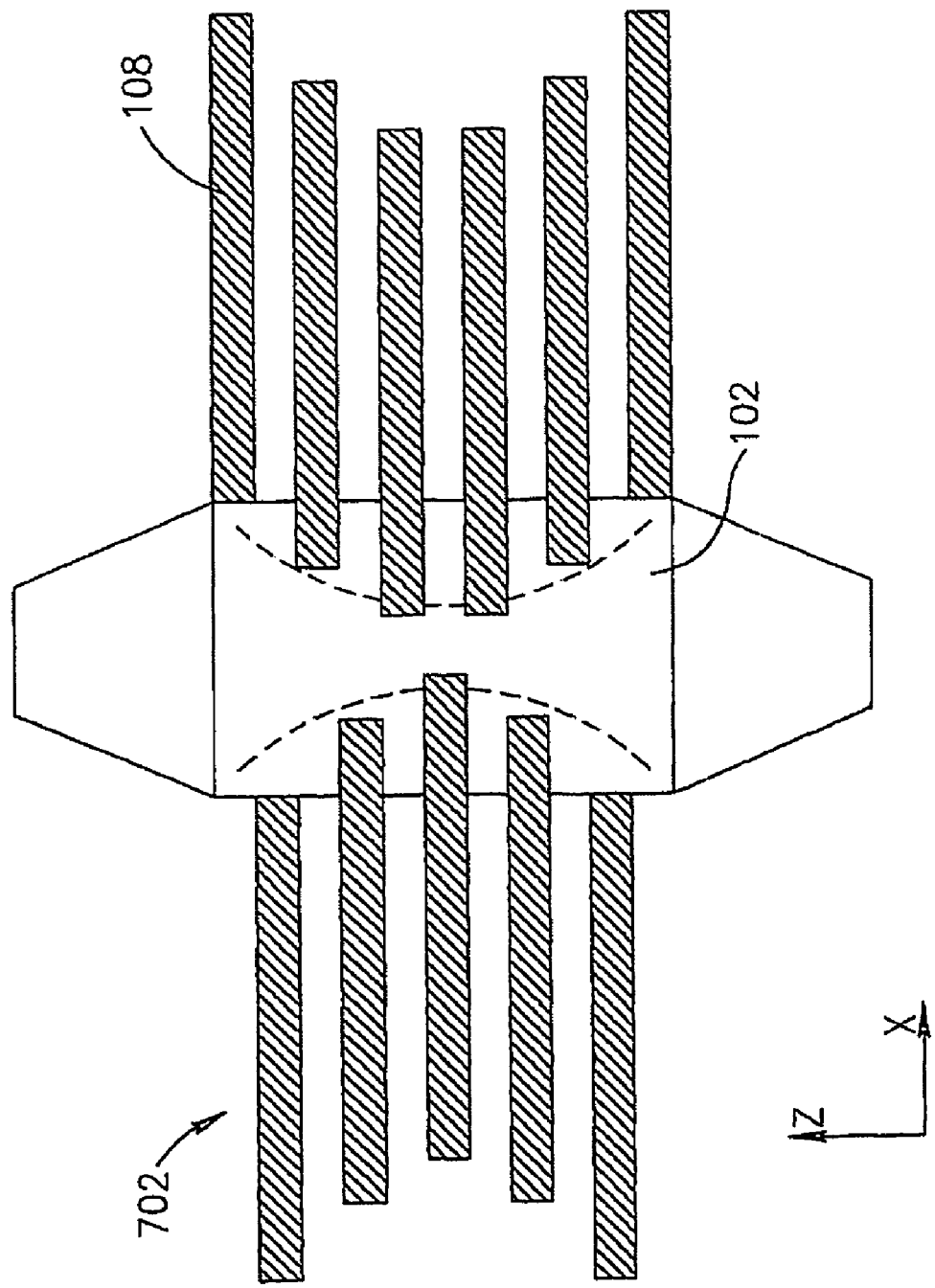
FIG. 7A is a schematic, simplified, plane view illustration of a heating element arrangement for apodization of a mode converter in accordance with exemplary embodiments of the present invention.
Figure 7B:
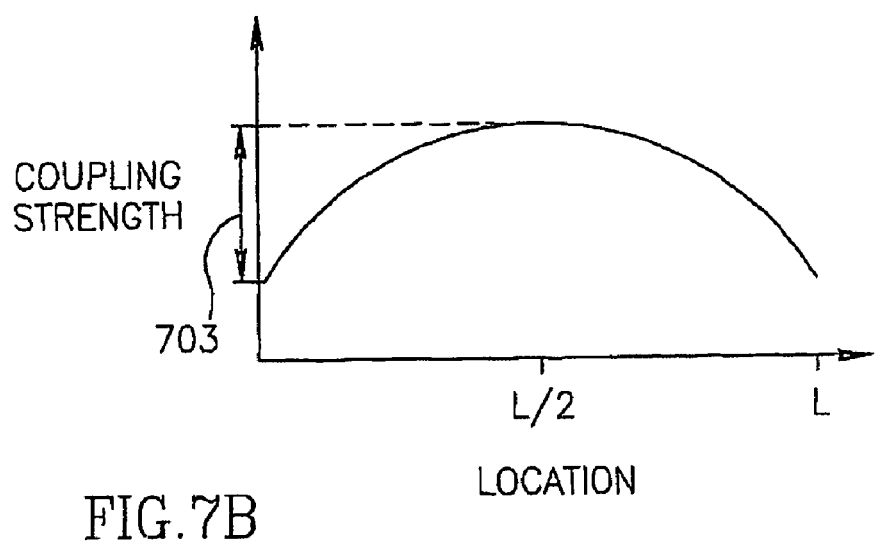
FIG. 7B is a schematic illustration of a graph depicting coupling strength as a function of location along a dynamic section associated with the heating element arrangement of FIG. 7A.

FIG. 7A schematically illustrates an exemplary arrangement 702 of heating elements 108 that may produce an apodization effect, in accordance with exemplary embodiments of the invention, and FIG. 7B schematically illustrates a graph depicting coupling strength as a function of location along dynamic section 102 associated with the heating element arrangement of FIG. 7A.

Apodization, in this context, means that a perturbation field applied by heating elements 108 may not be homogeneous, so that the mode-coupling strength may vary with length. In arrangement 702, the positions of heating elements 108 relative to the center of dynamic section 102 may be varied to produce the desired apodization effect. The apodization effect may be used to create a varying coupling strength, within a range 703, along dynamic section 102, as illustrated schematically in FIG. 7B. It will be appreciated by persons skilled in the art that arrangement 702 may allow conversion substantially only of signals whose wavelengths correspond to coupling levels within range 703, as described above.

Figure 7C:
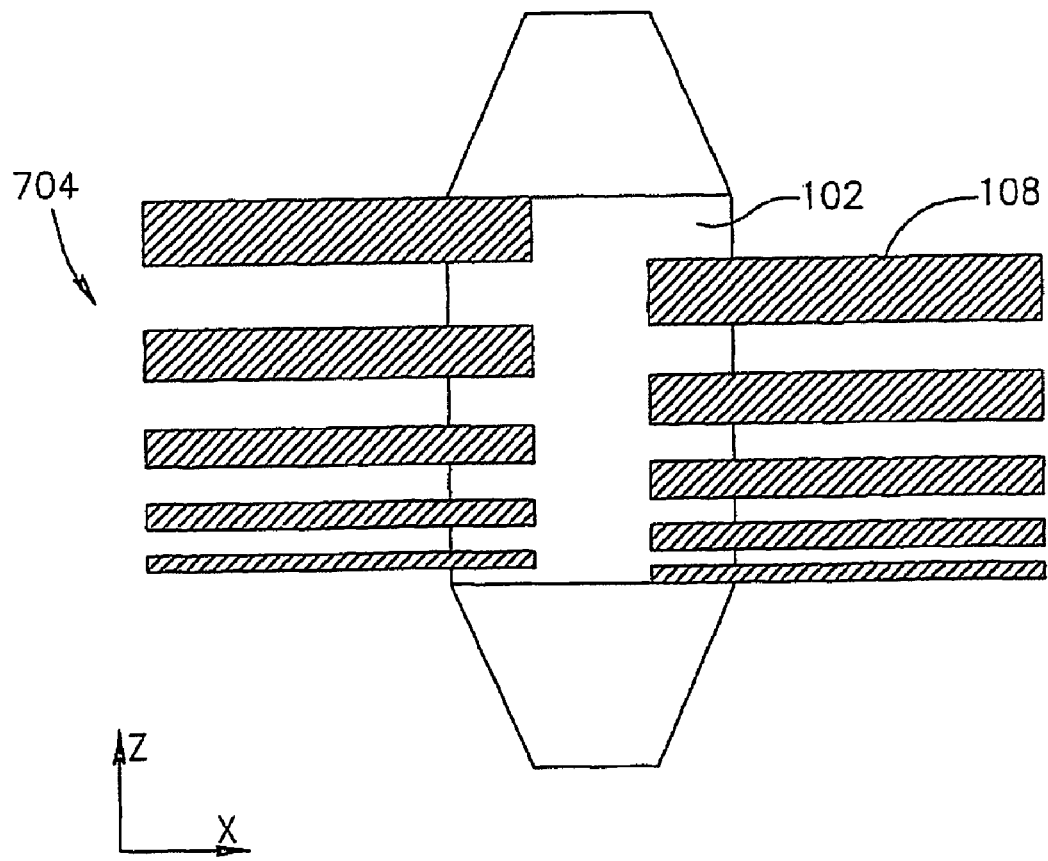
FIG. 7C is a schematic, simplified plane view illustration of a heating element arrangement for chirping of a mode converter in accordance with exemplary embodiments of the present invention.
Figure 7D:
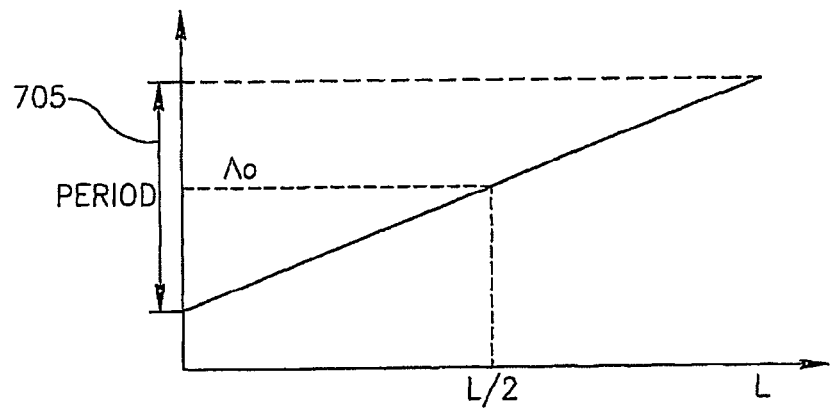
FIG. 7D is a schematic illustration of a graph depicting grating period as a function of location along a dynamic section associated with the heating element arrangement of FIG. 7C.

FIG. 7C illustrates an arrangement 704 of heating elements 108 to achieve a desired chirping effect, in accordance with exemplary embodiments of the invention, and FIG. 7D schematically illustrates a graph depicting grating period as a function of location along dynamic section 102 associated with the heating element arrangement of FIG. 7C.

Chirping, according to embodiments of the invention, may be based on slight period variations along the length of the dynamic section. In arrangement 704, the width of heating elements 108 may be varied along the length of the dynamic section to produce a desired chirping effect. The chirping effect may be used to create a varying grating period, within a range 705, along dynamic section 102, as illustrated schematically in FIG. 7D. It will be appreciated by persons skilled in the art that arrangement 704 may allow conversion substantially only of signals whose wavelengths correspond to grating periods within range 705, as described above.

According to further embodiments of the invention, one or more mode converters as described herein may be adapted to perform the function of a Dynamic Gain Equalizer (DGE), which may be used in optical networks, e.g., for "spectrum flattening" of an optical signal. In exemplary embodiments of the invention, the DGE may provide a predetermined wavelength filtering function, for example, to compensate for a wavelength dependent response of an amplifier. A filter function over a given spectrum may be implemented by dividing the spectrum to N sections, each having a representative, e.g., central wavelength, $\lambda_i$. Then, by appropriately combining N basic filter functions, each centered at a different wavelength $\lambda_i$, wherein at least one filter function is implemented using a mode converter as described above with reference to FIG. 6, a more complex filter function may be approximated, as is known in the art. It will be appreciated that the larger the number of basic functions, the better the approximation that may be achieved.

According to an exemplary embodiment of the invention, a DGE may be implemented by combining N mode converters, such as MC 100 (FIG. 1), wherein each MC 100 may have a grating period corresponding to a maximum response at $\lambda_i$ and a wavelength response representing a basic function.

Figure 8:
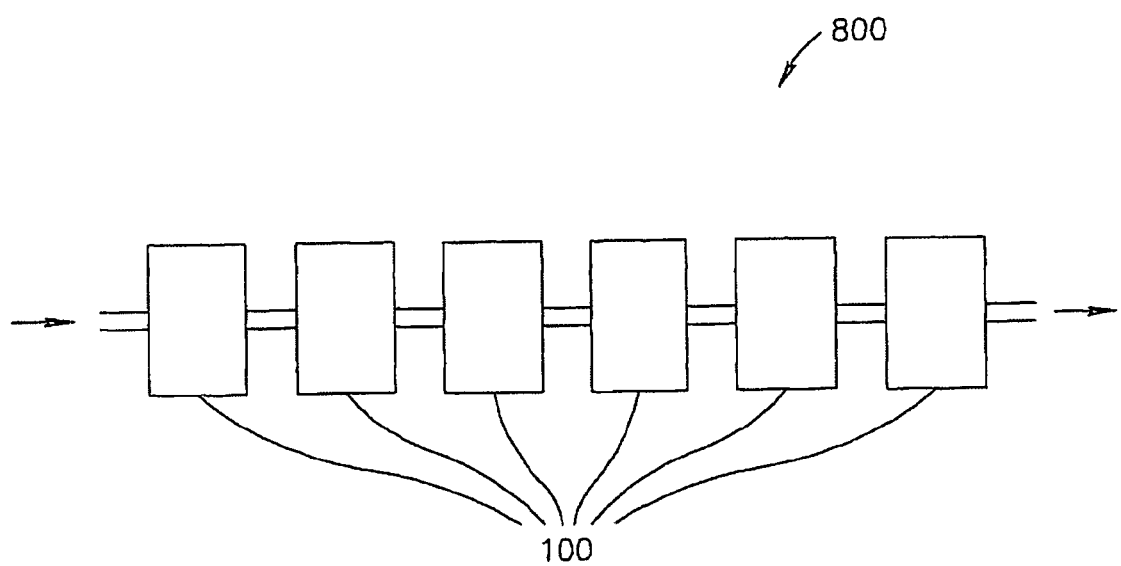
FIG. 8 is a schematic illustration of a Dynamic Gain Equalizer (DGE) constructed using a set of mode converters, in accordance with an embodiment of the present invention.
Figure 9:
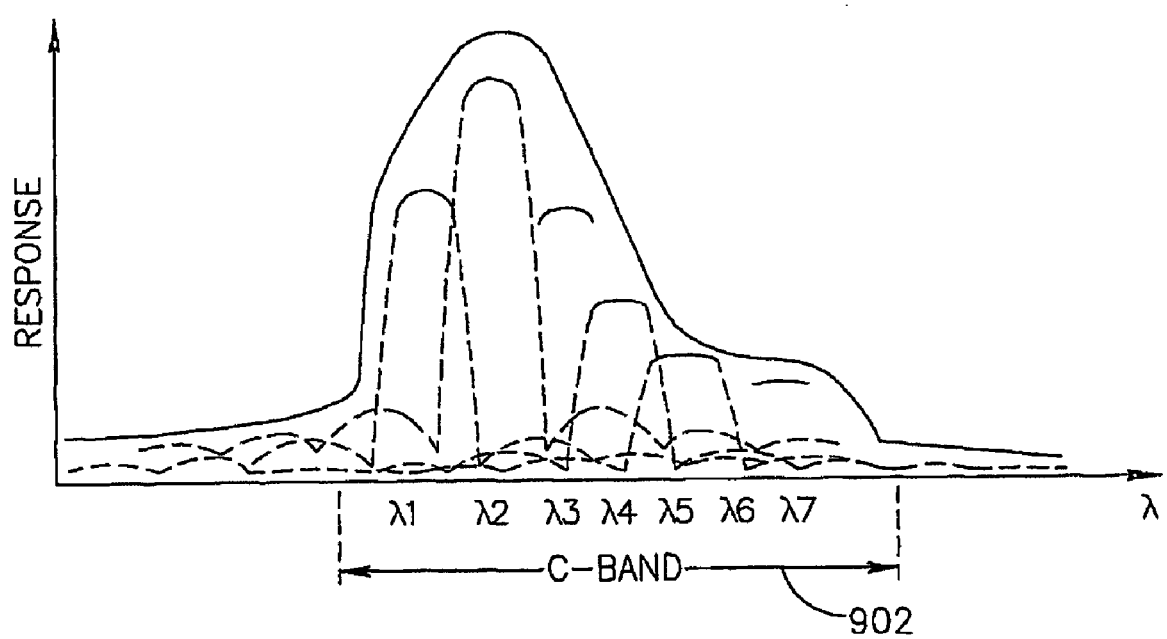
FIG. 9 is a schematic illustration of a graph depicting response versus wavelength of the DGE of FIG. 8.

FIG. 8 schematically illustrates a DGE 800 constructed using a set of mode converters 100, in accordance with an embodiment of the present invention, and FIG. 9 schematically illustrates a graph depicting response versus wavelength of DGE 800.

According to an exemplary embodiment of the invention, DGE 800 may include a combination of six mode converters 100 (FIG. 1), which may be connected in a row, each having a grating period corresponding to a spectrum centered at a different wavelength, $\lambda_i$, together providing an expanded transmission spectrum covering a desired wavelength range, for example, a C-band 902.

As is known in the art, a C-band represents a range of wavelengths commonly used in Optical communications, for example, between approximately 1.525 micrometers and approximately 1.57 micrometers.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A mode conversion apparatus comprising a dynamic waveguide section associated with a plurality of control elements that, when activated, are able to produce a periodic refractive-index perturbation pattern in said dynamic waveguide section, wherein said periodic refractive-index perturbation pattern is able to convert at least a fraction of an input signal from a first guided mode of said dynamic waveguide section into a second guided mode of said dynamic waveguide section, and wherein said first guided mode and said second guided mode have different order, wherein said plurality of control elements comprise an arrangement of heating elements able to produce, in response to electric power applied thereto, a predetermined spatially modulated increase in temperature at regions of said dynamic waveguide section substantially corresponding to said periodic refractive-index perturbation pattern.

2. The apparatus of claim 1 wherein said control elements are selectively activated to produce said periodic refractive-index perturbation pattern.

3. The apparatus of claim 1 wherein said control elements are controllably activated to produce said periodic refractive-index perturbation pattern.

4. The apparatus of claim 1 further comprising an input section able to guide at least said first guided mode.

5. The apparatus of claim 4 wherein said input section comprises an adiabatic waveguide expander.

6. The apparatus of claim 5 wherein said adiabatic waveguide expander comprises a tapered waveguide.

7. The apparatus of claim 1 further comprising an output section able to guide at least one of said first and second guided modes.

8. The apparatus of claim 6 wherein said output waveguide comprises an adiabatic waveguide constrictor.

9. The apparatus of claim 7 wherein said adiabatic waveguide constrictor comprises a tapered waveguide.

10. The apparatus of claim 1 wherein said dynamic section has a width sufficient to simultaneously guide both said first and second guided modes.

11. The apparatus of claim 1 wherein said arrangement of heating elements comprises strips of an at least partially resistive material sequentially connected by strips of a substantially conducting material.

12. The apparatus of claim 1 wherein said arrangement of heating elements comprises a periodic configuration of strips of a substantially conducting material attached to a layer of an at least partially resisting material.

13. The apparatus of claim 1 wherein said heating elements are arranged in an apodization pattern able to produce a predetermined coupling between said first and second guided modes, wherein said coupling varies along the length of said dynamic section.

14. The apparatus of claim 13 wherein a transverse position of said heating elements relative to a center of said dynamic section varies according to a predetermined scheme.

15. The apparatus of claim 1 wherein said heating elements are arranged in a chirping scheme to create a predetermined variation of the period of said periodic perturbation pattern along the length of said dynamic section.

16. The apparatus of claim 15 wherein a width of said heating elements varies according to a predetermined scheme along the length of said dynamic section.

17. An optical filter comprising an apparatus as in claim 1 wherein said conversion is effective only within a predetermined range of wavelengths of said input signal.

18. A variable optical attenuator comprising an apparatus as in claim 1 further comprising an attenuator input section associated with an input of said apparatus and an attenuator output section associated with an output of said apparatus, wherein said attenuator input and output sections are able to guide said first guided mode, and wherein said output section does not guide said second guided mode.

19. The apparatus of claim 18 wherein said first guided mode is a zero-order mode.

20. The apparatus of claim 18 wherein said attenuator input section and said attenuator output section are tapered.

21. A variable optical attenuator comprising:
an attenuator input section able to guide an input signal in a first guided mode;
a dynamic waveguide section associated with a plurality of control elements that, when activated, are able to produce a periodic refractive-index perturbation pattern in said dynamic waveguide section, wherein said periodic refractive-index perturbation pattern is able to convert a fraction of said input signal from said first guided mode into a second guided mode, wherein said first guided mode and said second guided mode have different order, wherein said plurality of control elements comprise an arrangement of heating elements able to produce, in response to electric power applied thereto, a predetermined spatially modulated increase in temperature at regions of said dynamic waveguide section substantially corresponding to said periodic refractive-index perturbation pattern; and
an attenuator output section able to guide said first guided mode and prevented from guiding said second guided mode.

22. The apparatus of claim 21 wherein said first guided mode is a zero-order mode.

23. A method of mode conversion comprising:
selectively activating a periodic refractive-index perturbation pattern of a dynamic waveguide section to convert at least a fraction of an input signal from a first guided mode of said dynamic waveguide section into a second guided mode of said dynamic waveguide section, wherein said first guided mode and said second guided mode have different order, wherein said step of selectively activating comprises producing, in response to electric power applied thereto, a predetermined spatially modulated increase in temperature at regions of said dynamic waveguide section substantially corresponding to said periodic refractive-index perturbation pattern.

24. The method of claim 23 wherein selectively activating comprises controllably activating said periodic refractive-index perturbation pattern to convert a predetermined fraction of said first guided mode into said second guided mode.

25. Apparatus comprising a plurality of filters as in claim 17, each having a maximum response at a pre-determined wavelength and a wavelength response representing a basic function, respectively, such that said apparatus has a predetermined wavelength filtering function.

* * * * *